G. ALMBERG.
AUTOMATIC WEIGHING MACHINE.
APPLICATION FILED DEC. 15, 1919.

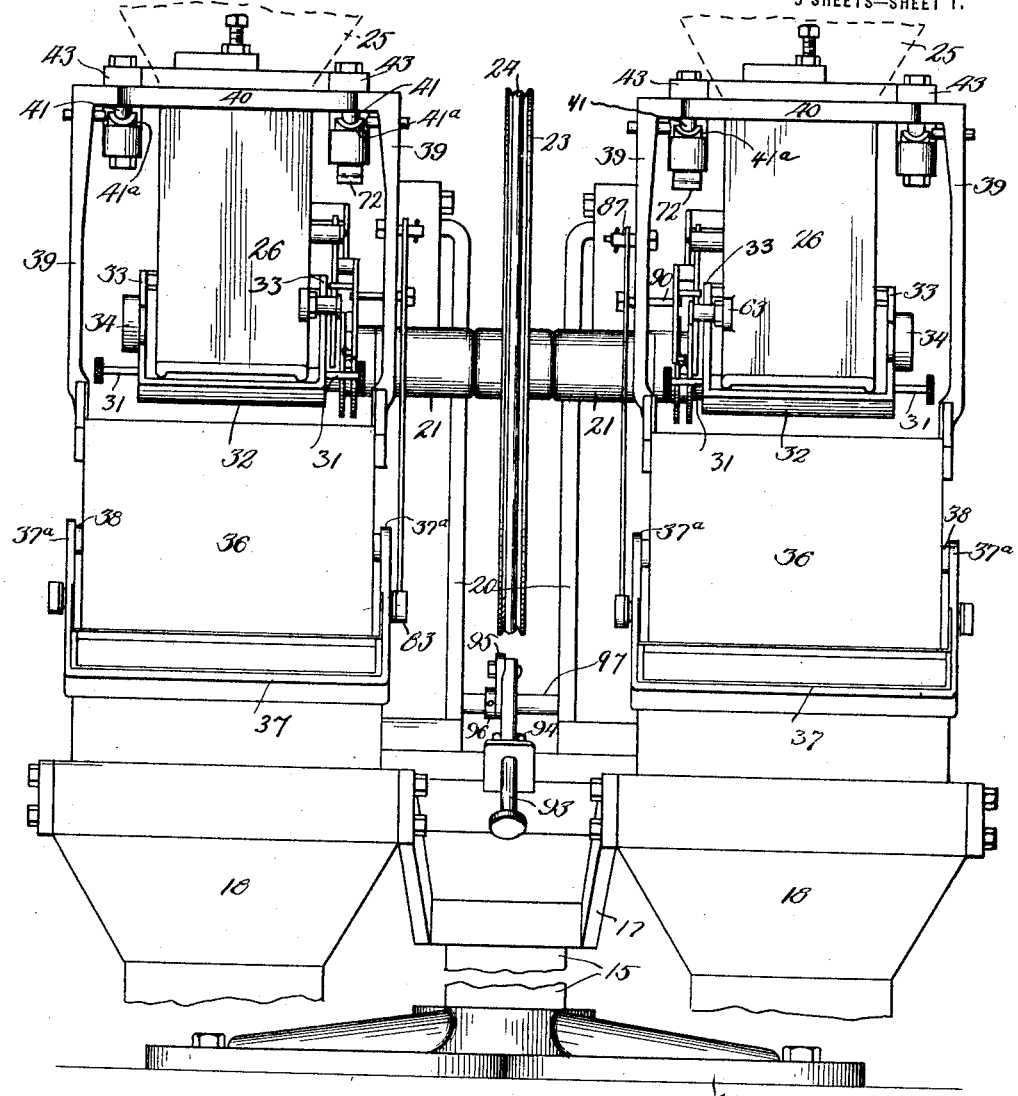
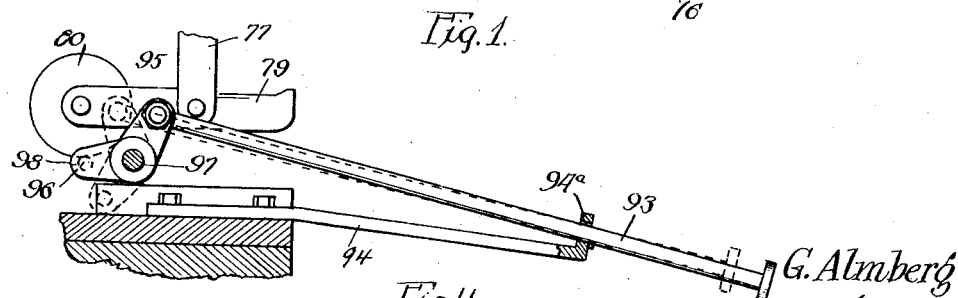

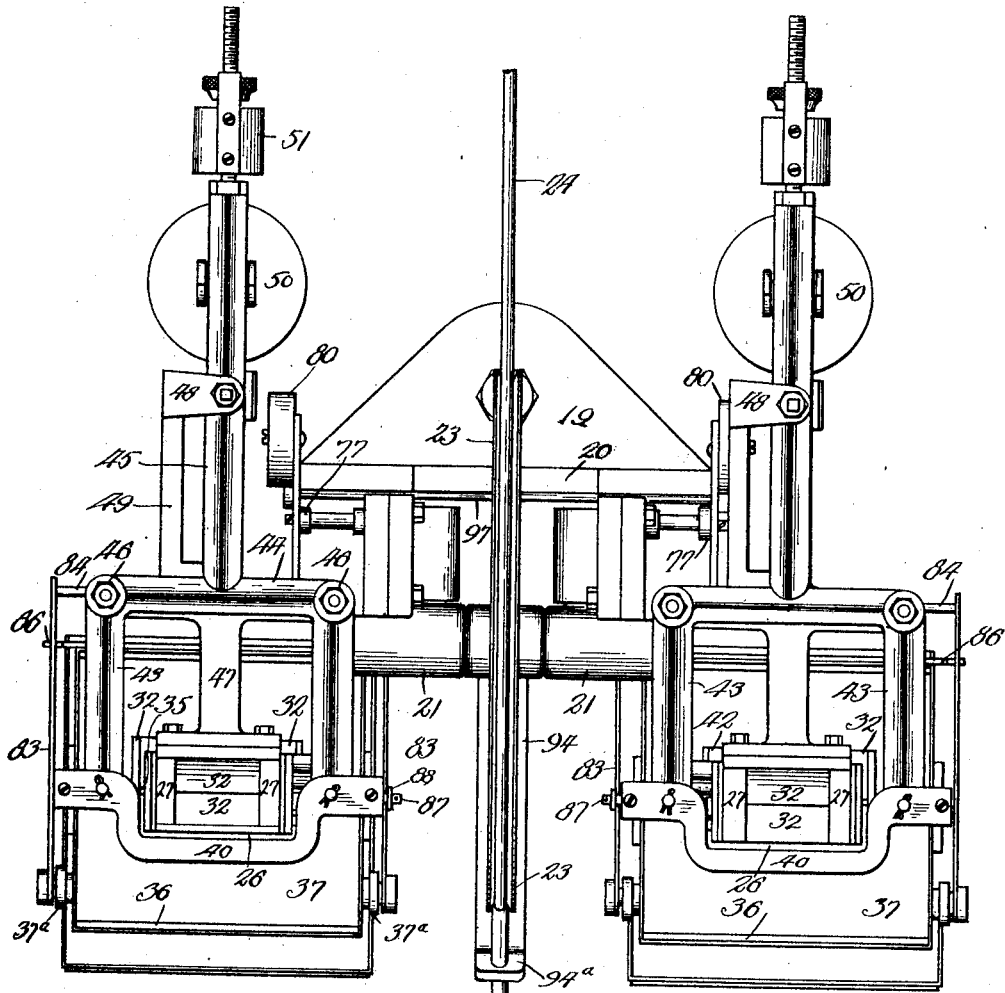

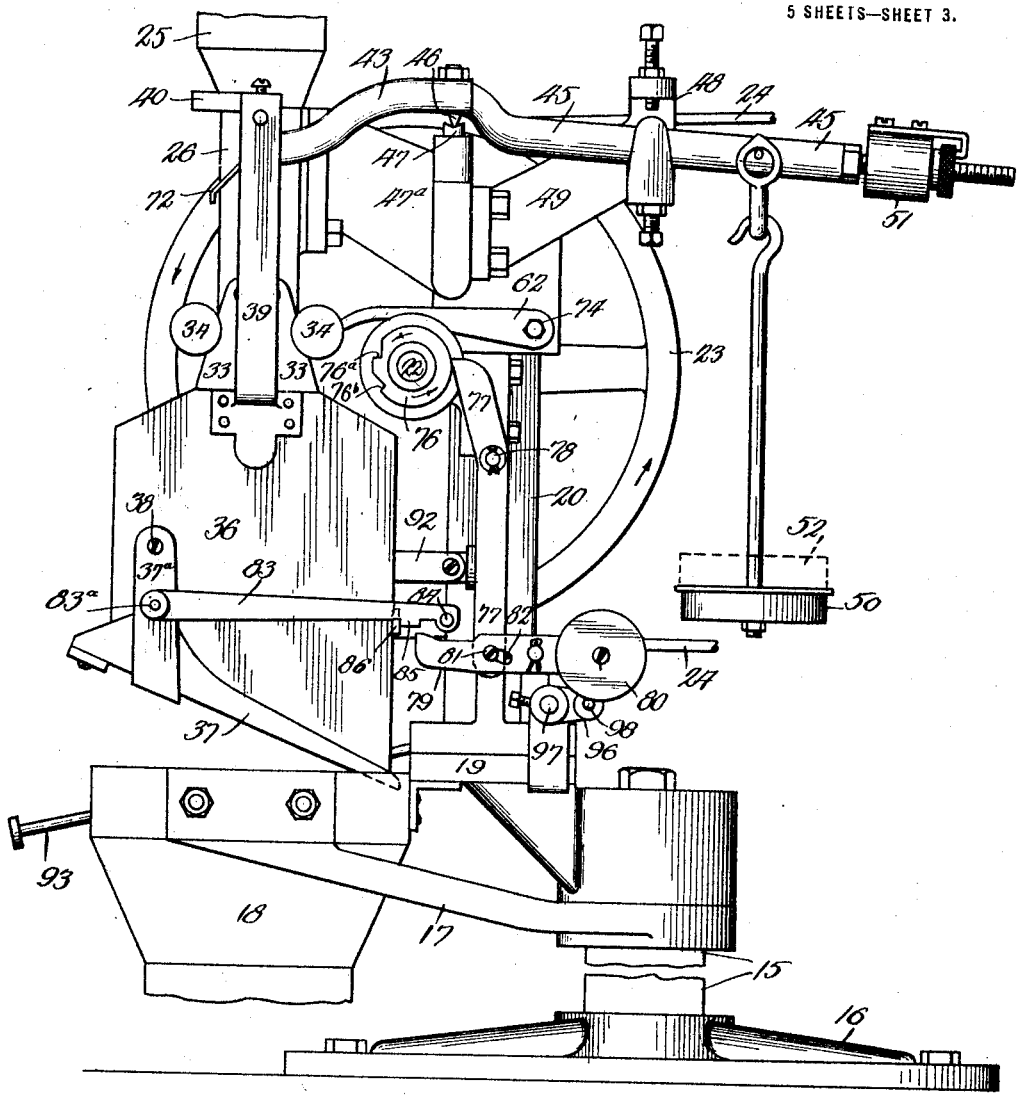

1,383,279.

Patented July 5, 1921.
5 SHEETS—SHEET 4.

G. Almberg
Inventor

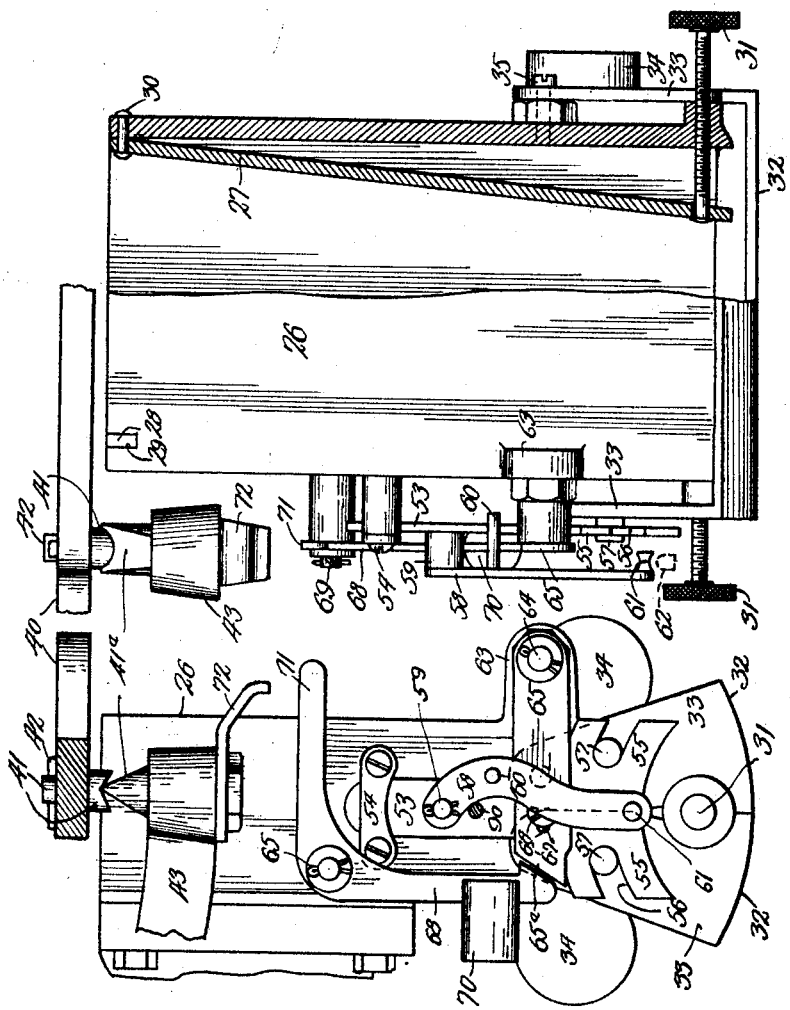

UNITED STATES PATENT OFFICE.

GUSTAVE ALMBERG, OF CHICAGO, ILLINOIS.

AUTOMATIC WEIGHING-MACHINE.

1,383,279.

Specification of Letters Patent.   Patented July 5, 1921.

Application filed December 15, 1919. Serial No. 344,792.

*To all whom it may concern:*

Be it known that I, GUSTAVE ALMBERG, a citizen of the United States, residing at Chicago, in the county of Cook and State of Illinois, have invented new and useful Improvements in Automatic Weighing-Machines, of which the following is a specification.

This invention relates to machines for automatically weighing granular material, such as sugar, farina, rice, salt, etc., and delivering the same to a bag or other receptacle.

The invention has for its object to provide a novel and improved machine of the kind stated, and also one which is reliable and rapid in operation.

The object stated is attained by means of a combination and arrangement of parts to be hereinafter described and claimed, and in order that the same may be better understood, reference is had to the accompanying drawings forming a part of this specification.

The preferred embodiment of the invention has been disclosed, but it will be understood that various changes and modifications may be made without a departure from the spirit and scope of the invention as claimed hereinafter.

In the drawings—

Figure 1 is an elevation of the machine;

Fig. 2 is a plan view thereof;

Fig. 3 is a side elevation viewed from the right of Fig. 1;

Fig. 5 is an enlarged elevation, partly in section of a detail;

Fig. 6 is a side elevation of the parts shown in Fig. 5;

Fig. 7 is a view similar to Fig. 6, but showing the parts in another position;

Figs. 8 to 10 are detail views which will be referred to hereinafter, and

Fig. 11 is an elevation of a manual control device.

Figure 4:
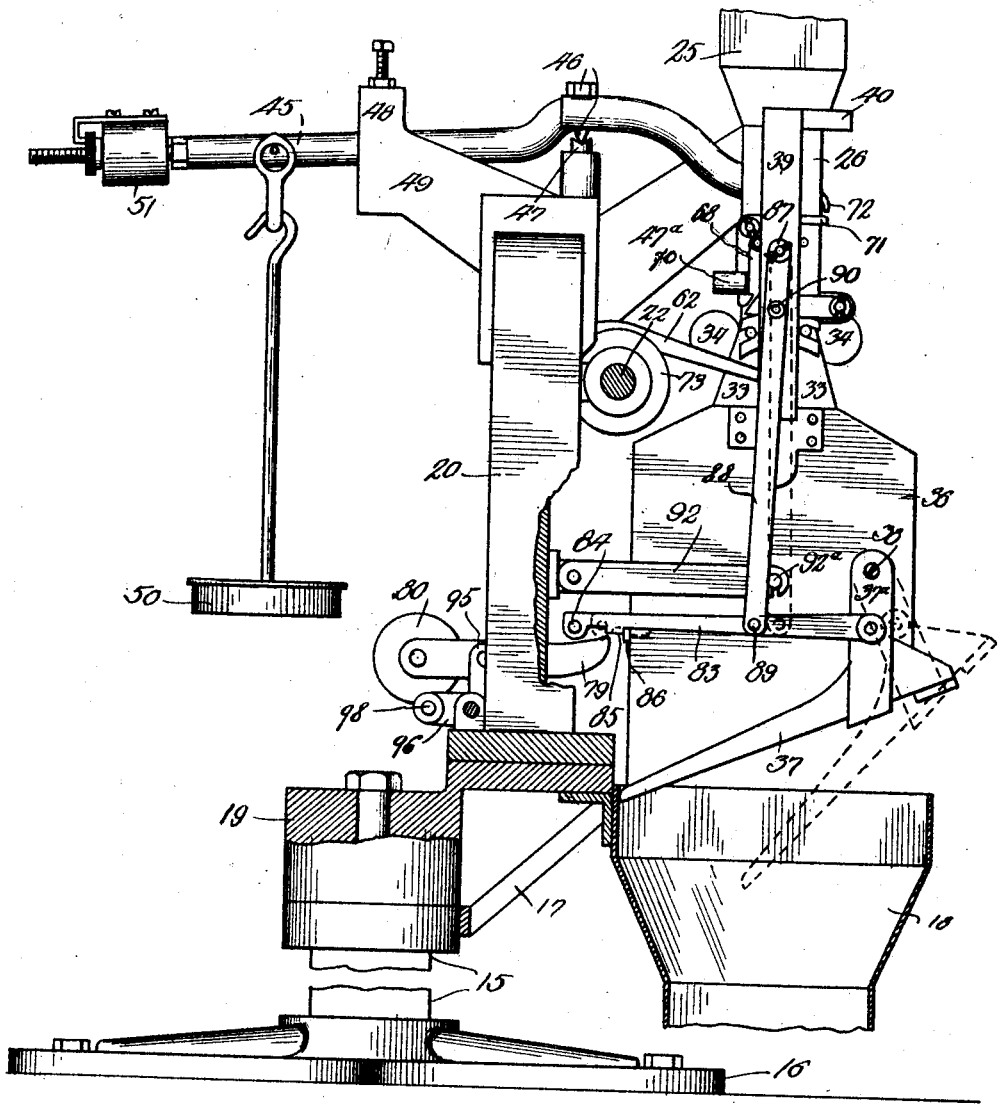
Fig. 4 is a side elevation partly in section, of one of the units.

The drawings illustrate a machine composed of two complete units, set side-by-side and operated by a single driving means. This type of machine is of advantage for speed, as one person can handle the receiving bags or sacks for both units, by sliding one sack into receiving position while removing the other. Furthermore, two different materials can be handled at the same time so as to provide a supply of both continually. The output of the machine can be further increased by providing additional units, or where a machine of limited capacity is desired, a single unit may be provided.

Referring specifically to the drawings, 15 denotes a post rising to a suitable height from a base 16. The post carries, at the top a bracket member 17 which supports hoppers 18, and said post also carries a support 19 for a frame 20 supporting certain mechanism to be presently described. The frame 20 has bearings 21 for a horizontal shaft 22 provided with a pulley 23 or other means whereby it is driven from a suitable power source. A drive belt 24 is shown.

At 25 are shown fragments of two receptacles serving as storage reservoirs for the material to be weighed. These receptacles are shown dotted in Fig. 1. Each receptacle communicates with a delivery trunk 26 which is also open at the bottom. Alongside opposite walls of the trunk 26, on the inside thereof, are false walls 27 of heavy but resilient material, which have side wings 28 at the top extending into slots 29 of the adjacent walls of the trunk at the top thereof. A fastening, consisting of one or more rivets 30, is also provided, and the walls have a normal tendency to converge downwardly as shown in Fig. 5. The walls 27 may be retracted or brought closer to the adjacent walls of the trunk, by a screw 31 threaded through the latter and loosely connected to the former. The purpose of the walls 27 is to direct the material to the center of the trunk, and also to vary the area thereof and thus control the amount of material discharged.

The discharge of material from the trunk 26 is controlled by two opposite gates 32 which spread when they open, and come together when they close. These gates have side walls 33 which are located on the outside of opposite walls of the trunk, and provided with weights 34 to cause the gates to close quickly. The gates are pivoted at a common point 35 to the opposite walls of the trunk.

Beneath the trunk 26 is a weighing receptacle 36 into which the material drops when the gates 32 are swung open. This receptacle has a pivoted bottom gate 37 provided with side arms 37ª which are hung from pivots 38 on opposite walls of the receptacle. The weight of the material resting on the gate 37 swings the same to open position as shown dotted in Fig. 4, when said gate is unlatched. Beneath the receptacle is the hopper 18 into which the material drops for delivery to the sacks, bags or other containers which are to receive the weighed quantities of material.

From the weighing receptacle 36 rises a frame composed of side bars 39 and a top cross bar 40. As shown in Figs. 2, 5, and 6, the cross bar 40 carries bearing blocks 41 secured by cotter pins 42, and seating on knife edge fulcrum blocks 41ª carried by the front ends of two rearwardly extending lever arms 43 connected by a cross bar 44 from which a scale beam 45 extends. The cross bar 44 carries knife-edge blocks 46 at its ends seating on fulcrum blocks 47 carried by bracket arms 47ª supported by the frame of the machine. The beam 45 passes through a stroke-limiting device 48 held by frame brackets 49, and is provided at its outer end with a weight support 50 and a leverage adjusting screw 51, these parts being of standard construction. Thus when a weight, as shown at 52, is on the support 50, this end of the scale beam 45 is down as clearly shown in Figs. 3 and 4, the receptacle 36 now being empty.

The gates 32 hereinbefore described control the discharge of material from the trunk 26 into the weighing receptacle 36, and their operating means will now be described.

Opposite one of the side walls 33 of the trunk 26 is positioned a plate 53 which is vertically slidable under a guide 54. The lower portion of this plate has lateral wings 55 provided with curved recesses 56 to form cams for pins 57 projecting from the gate sides 33. Thus, when the plate 53 moves upwardly, the gates 32, through the cam recesses and the pins, are made to spread to open position, and when the plate moves downwardly the gates come together and close. The operation of opening and closing the gates is therefore made positive, and they cannot open too far, nor slam together and partly open again from the recoil.

The slide plate 53 is operated by a link 58 pivoted thereto at 59 and normally hanging free from the pivot. The link 58 has an outstanding pin or other abutment 60 near the top to engage the edge of the slide plate, and thus keep the link from swinging to the left of its normal pendent position shown in Fig. 6, and at the bottom of the link is a small knob or other abutment 61 which is in the path of, and thus engageable by the lever 62 operated by a means to be presently described. When this lever swings upwardly, it presses against the abutment 61, and through the link 58 the plate 53 is operated to open the gates 32.

To a lug 63 on the trunk 26 is pivoted, as shown at 64, a latch lever 65 having its free end beveled as shown at 65ª to form a cam surface. This lever is held next to the slide plate 53 by a screw 66 passing through a slot 67 in the lever to permit arcuate motion thereof. To the wall of the trunk 26 is pivoted as shown at 69, a detent 68 weighed at 70 and having a projecting lever arm 71. The detent has the shape of an angle bar as shown in Figs. 5 and 6. When the link 58 is moved upwardly by the lever 62 to open the gates 32, the lever 65 will also rise against the detent 68 until the latter slips and catches the same as shown in Fig. 7. The gates are now locked in open position, and so held until a finger 72 carried by the scale beam arms 43 descends with said arms as the scale beam 45 tilts, and bears down on the end 71 of the detent to trip the latter off the latch lever 65, whereupon the gates are left free to swing closed.

The lever 62 is operated from the drive shaft 22, the latter carrying a spool 73 between the ends of which the lever seats. The lever 62 is pivoted at 74 to the frame of the machine. Across the spool extends a pin 75 which periodically engages the lever and lifts the same.

It will now be understood that the material which is discharged by the opening of the gates 32, is cut off by the closing thereof as soon as the weighing receptacle 36, carried by the scale beam 45, drops from the weight of the material it receives the tips the scale beam, this movement of the scale beam actuating the detent 68 through the fingers 72 as hereinbefore described. The following means are provided for discharging the material from the weighing receptacle.

It will be noted in Fig. 3 that one end of the spool 73 carries a cam disk 76 having drops 76ª and 76ᵇ, respectively. Against the edges of this cam bears a follower 77 pivoted at 78 to the frame of the machine, and held against the cam by the action of a rocker arm 79 weighted at one end as shown at 80. The connection between the parts 77 and 79 is made by a screw 81, so as to permit the follower to move laterally into the drops or depressions of the disks 76. When the follower rides out of a depression, the parts move to the dotted line position shown in Fig. 10, causing the rocker arm 79 to tilt by reason of the pin and slot connection with the follower.

As described hereinbefore, the gate 37 is swung open by the weight of the material in the receptacle 36, and hence it is necessary to have a means for holding the gate closed during the filling and weighing operation. For this purpose, latch arms 83 extend from the bracket members 37ª of the gate, they being pivoted to the bracket members, as shown at 83ª, and connected at their free ends by a cross rod 84. Just back of the receptacle 36, each arm 83 has a bottom lug 85, which latter, when the gate 37 is closed, lies back of a keeper strip 86 secured to the back of the receptacle, whereby the gate is held closed. The keeper strip is reduced at its ends to provide a better seat for the latch arms. The forward end of the rocker arm 79 extends under the cross rod 84 at a point intermediate its ends, and hence when the follower slips into the cam depression 76ª to the full line position shown in Fig. 10, the rise of the front end of the rocker arm 79 causes the latter to strike and lift the cross rod 84. This, of course, disengages the lug 85 from the keeper strip 86, whereupon the gate 37 is unlocked and permitted to be swung open by the weight of the material in the weighing receptacle 36, and on its recoil it will be prevented from returning to closing position nearer than the dotted position shown in Fig. 4, by the lug 85 which is now in front of the keeper strip 86. By this time, the continued rotation of the power-driven cam 76 again causes the follower 77 to swing, but it now slips into the depression 76ᵇ. This movement of the follower causes the arm 79 to strike the cross rod 84 and to trip the latch arms 83 to elevate the lug 85 above the keeper strip 86, whereupon the latch arms are freed and gate 37 is permitted to swing closed by its own weight.

In operation, the pulley 23 receives motion from a suitable power source and it is driven in the direction of the arrows in Fig. 3. Assuming that the spool 73 has actuated the lever 62 to open the gates 32, the material drops from the trunk 26 into the weighing receptacle 36. As soon as the weight of the material in the receptacle 36 tilts the scale beam 45, the gates 32, through the action of the finger 72 as hereinbefore described, close and cut off the flow of material into the receptacle. The cam depression 76ª and 76ᵇ now come into action to release and then close the gate 37 of the receptacle as hereinbefore described, and the material drops into the hopper 18 beneath which will be held the bag or other container to receive the material. The discharge of material from the receptacle 36 causes the scale beam 45 to tilt back, raising the finger 72 clear of the detent arm 71 to permit the gates 32 to swing open once more and allow the material in the trunk 26 to again discharge into the weighing receptacle 36.

Figure 9:
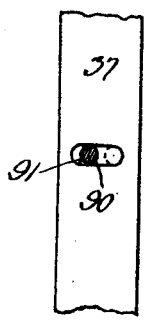

A safety device is also provided to make certain that the gates 32 will not swing open while the gate 37 is open. Referring to Figs. 1, 4 and 9 it will be noted that one of the side bars 39 has a pivot pin 87 on which is hung a depending link 88 pivotally connected at its lower end to one of the latch arms 83, as shown at 89. Near its upper end, the link 88 has a laterally projecting abutment or pin 90 which passes through a slot 91 in one of the bars 39 (see Fig. 9), and engages one edge of the link 58, this edge having a concave curvature as shown in Figs. 6 and 7. When the parts are in normal position, the pin 90 seats alongside the link 58 without affecting the latter, but when the gates 32 open as shown in full lines in Fig. 7, the link 58 only moves upwardly, the pin 90 remaining as before. Now as the weight of the material in the receptacle 36 gradually causes the latter to descend, the link 88, with its pin 90, will also lower, the pin assuming the dotted position in Fig. 7. The receptacle 36 is now fully weighed, the gates 32 have already closed, and the gate 37 is about to swing open to effect the discharge of the weighed material from the receptacle. As the gate 37 swings open, the link 88 being connected to the latch arm 83 swings back to the dotted line position in Fig. 4, and the link 58 is now given a further push by the pin 90. The abutment 61 of the link 58 will now be out of the path of the lever 62 while the gate 37 is down, so that the chances of accidental opening of the gates 32 by the lever 62 will be practically impossible.

The part 92 in Fig. 4 is a hook pivotally supported by the frame 20 and engageable with a pin 92ª on the side of the receptacle 36 to keep the latter from swinging outwardly during rapid action and causing disengagement of the parts 41 and 41ª.

Figs. 1, 3 and 11 show a manual control designed to throw the machine out of gear, leaving the pulley 23 and shaft 22 running until the machine is again to be operated. A long push rod 93 supported by a bracket 94 actuates two cranks 95 and 96 fast on a shaft 97 at the rear of the machine. The crank 96 has a side pin 98 which is located beneath the weight 80. The full line position of the rod 93 in Fig. 11 shows the pin 98 has pushed up the weight 80. This draws the follower 77 out of reach of cam 76, and the latch disengaging rocker arm 79 out of reach of the cross rod 84, so that the gate 37 of the weighing receptacle 36 cannot be moved. When the parts are moved to the dotted line position in Fig. 11, the pin 98 is free of the weight 80, whereby the parts 77 and 79 are allowed to come back to their normal position. The rod 93 is locked against a return movement by being flexed sufficiently to bind in its bearing 94ª on the bracket 94, this flexure being due to the weight of the parts bearing on the pin 98.

I claim:

1. In a weighing machine, a material feed trunk, a pair of pivoted gates controlling the trunk outlet, a slidable member supported by the sides of the trunk and having cam recesses, outstanding pins on the gates seating in the recesses, said recesses being shaped to open the gates when the slidable member moves in one direction and to close the gates when moved in another direction, means for operating the slidable member, a latch mechanism for holding the gates open, a weighing receptacle into which the trunk discharges, and a pivoted scale beam carrying said receptacle, said scale beam having means for controlling the latch mechanism.

2. In a weighing machine, a material feed trunk, a pair of pivoted gates controlling the trunk outlet, a slidable member supported by the sides of the trunk and having cam recesses, outstanding pins on the gates seating in the recesses, said recesses being shaped to open the gates when the slidable member moves in one direction and to close the gates when moved in another direction, means for operating the slidable member, a latch mechanism for holding the gates open, a weighing receptacle into which the trunk discharges, a pivoted scale beam carrying said receptacle, said scale beam having means for controlling the latch mechanism, a discharge gate for the weighing receptacle, and a latch mechanism for said discharge gate.

3. In a weighing machine, a material feed trunk, a pair of pivoted gates controlling the trunk outlet, a slidable member supported by the sides of the trunk and having cam recesses, outstanding pins on the gates seating in the recesses, said recesses being shaped to open the gates when the slidable member moves in one direction and to close the gates when moved in another direction, means for operating the slidable member, a latch mechanism for holding the gates open, a weighing receptacle into which the trunk discharges, a pivoted scale beam carrying said receptacle, said scale beam having means for controlling the latch mechanism, a discharge gate for the weighing receptacle, a latch mechanism for said discharge gate, operating means for the last mentioned latch mechanism, and a power-driven shaft having means for controlling said operating means.

4. In a weighing machine, a weighing receptacle, a pivoted scale beam carrying said receptacle, a discharge gate for the receptacle, a material supply receptacle positioned to discharge into the weighing receptacle, a gate controlling the discharge from the supply receptacle, controlling means for the gates operable to open the same in alternate order, a power-driven shaft for operating the controlling means of the first mentioned gate, and means controlled by the first mentioned gate for preventing opening of the second mentioned gate while said first mentioned gate is open.

5. In a weighing machine, a weighing receptacle, a pivoted scale beam carrying said receptacle, a discharge gate for the receptacle, a material supply receptacle positioned to discharge into the weighing receptacle, a gate controlling the discharge from the supply receptacle, controlling means for the gates operable to open the same in alternate order, the controlling means of the second mentioned gate being operable by the movement of the weighing receptacle, a power-driven shaft for operating the controlling means of the first mentioned gate, and means controlled by the first mentioned gate for preventing opening of the second mentioned gate while said first mentioned gate is open.

6. In a weighing machine, a weighing receptacle, a pivoted scale beam carrying said receptacle, a discharge gate for the receptacle, a material supply receptacle positioned to discharge into the weighing receptacle, a gate controlling the discharge from the supply receptacle, controlling means for the gates operable to open the same in alternate order, a power-driven shaft for operating the controlling means of the first mentioned gate, and means for placing the controlling means of the first mentioned gate in inoperative position.

7. In a weighing machine, a weighing receptacle, a pivoted gate for the outlet of said receptacle, a latch for holding the gate closed, a latch releasing means, a power driven shaft having means for periodically actuating said releasing means, a feed receptacle positioned to discharge into the weighing receptacle, a gate controlling the discharge from the feed receptacle, and means for placing the aforesaid latch releasing means in inoperative position.

8. In a weighing machine, a material supply receptacle, a gate controlling the discharge from said receptacle, a slidable member, means associated with said member for operating the gate, a latch lever connected to the slidable member, a pivoted detent engageable by the latch lever when the gate is open for holding the same in open position, a weighing receptacle into which the supply receptacle discharges, a pivoted scale beam carrying the weighing receptacle, and means carried by the scale beam for tripping the aforesaid detent.

9. In a weighing machine, a material supply receptacle, a weighing receptacle into which the supply receptacle discharges, a gate controlling the discharge from the supply receptacle, a discharge gate for the weighing receptacle, means for operating the gate of the supply receptacle, a latch mechanism for holding the gate of the weighing receptacle closed, and a power driven shaft having means for actuating the aforesaid gate operating means and the latch mechanism in alternate order.

10. In a weighing machine, a material supply receptacle, a weighing receptacle into which the supply receptacle discharges, a gate controlling the discharge from the supply receptacle, a discharge gate from the weighing receptacle, means for operating the gate of the supply receptacle, a latch mechanism for holding the gate of the weighing receptacle closed, a power driven shaft having means for actuating the aforesaid gate operating means and the latch mechanism in alternate order, and means controlled by the movement of the weighing receptacle gate for preventing opening of the supply receptacle gate while said weighing receptacle gate is open.

11. In a weighing machine, a material supply receptacle, a weighing receptacle into which the supply receptacle discharges, a gate controlling the discharge from the supply receptacle, a discharge gate for the weighing receptacle, means for operating the gate of the supply receptacle, a latch mechanism for holding the gate of the weighing receptacle closed, means for actuating the aforesaid gate operating means and the latch mechanism in alternate order, and means controlled by the movement of the weighing receptacle gate for preventing opening of the supply receptacle gate while said weighing receptacle gate is open.

12. In a weighing machine, a material supply receptacle, a weighing receptacle into which the supply receptacle discharges, a gate controlling the discharge from the supply receptacle, a discharge gate for the weighing receptacle, means for operating the gate of the supply receptacle, a latch mechanism for holding the gate of the weighing receptacle closed, a power driven shaft having means for actuating the aforesaid gate operating means and the latch mechanism in alternate order, a latch for holding the supply receptacle gate in open position, and means operated by the weighing receptacle for tripping said latch.

In testimony whereof I affix my signature.

GUSTAVE ALMBERG.